US009028707B2

(12) United States Patent
Minor

(10) Patent No.: US 9,028,707 B2
(45) Date of Patent: May 12, 2015

(54) COMPOSITIONS COMPRISING REFRIGERANT AND LUBRICANT AND METHODS FOR REPLACING CFC AND HCFC REFRIGERANTS WITHOUT FLUSHING

(75) Inventor: Barbara Haviland Minor, Elkton, MD (US)

(73) Assignee: E I du Pont de Nemours and Company, Wilmington, DE (US)

( * ) Notice: Subject to any disclaimer, the term of this patent is extended or adjusted under 35 U.S.C. 154(b) by 403 days.

(21) Appl. No.: 13/391,913

(22) PCT Filed: Sep. 3, 2010

(86) PCT No.: PCT/US2010/047762
§ 371 (c)(1),
(2), (4) Date: Feb. 23, 2012

(87) PCT Pub. No.: WO2011/028970
PCT Pub. Date: Mar. 10, 2011

(65) Prior Publication Data
US 2012/0145946 A1 Jun. 14, 2012

Related U.S. Application Data

(60) Provisional application No. 61/239,870, filed on Sep. 4, 2009.

(51) Int. Cl.
C09K 5/04 (2006.01)
C10M 171/00 (2006.01)
(52) U.S. Cl.
CPC .............. *C09K 5/045* (2013.01); *C09K 2205/11* (2013.01); *C09K 2205/12* (2013.01); *C10M 171/008* (2013.01); *C10M 2203/0206* (2013.01); *C10M 2203/1006* (2013.01); *C10M 2203/1065* (2013.01); *C10M 2207/085* (2013.01); *C10M 2207/2835* (2013.01); *C10M 2209/043* (2013.01); *C10M 2209/1023* (2013.01); *C10N 2220/302* (2013.01); *C10N 2220/303* (2013.01)
(58) Field of Classification Search
CPC ............ C09K 5/045; C09K 5/04; C09K 5/00; C10M 171/008; C10M 105/38; C10M 111/02
USPC ....................... 252/68; 62/468, 470
See application file for complete search history.

(56) References Cited

U.S. PATENT DOCUMENTS 5,372,737 A * 12/1994 Spauschus .................. 252/68
5,866,030 A * 2/1999 Reyes-Gavilan et al. ....... 252/68
6,783,691 B1 * 8/2004 Bivens et al. ................ 252/67
7,258,813 B2 * 8/2007 Roberts et al. ............... 252/68
2002/0046568 A1 * 4/2002 Thomas et al. ................ 62/77
2010/0122545 A1 * 5/2010 Minor et al. ............... 62/324.1
2013/0096218 A1 * 4/2013 Rached et al. .............. 521/170
2013/0221262 A1 * 8/2013 Minor et al. .................. 252/2

FOREIGN PATENT DOCUMENTS

| EP | 1 201 733 A1 | 5/2002 |
| WO | 02/27248 A1 | 4/2002 |
| WO | 2007/099350 A1 | 9/2007 |
| WO | 2009/108547 A1 | 9/2009 |

OTHER PUBLICATIONS

John Tomczyk, "The Professor: Retrofit R-438A", The News, Nov. 2, 2009, pp. 1-4.*
Retrofit Handbook: R-22 Retrofit Guidelines and Procedures, National Refrigerants, Inc., 2009, pp. 1-26.*
Retrofit Guidelines for DuPont(TM), ISCEON MO99(TM) Series Refrigerant, DuPont, 2009, pp. 1-16.*
Refrigerant Changeover Guidelines HFC R-22 to HFC R-438A, Copeland Brand Products, 2007, pp. 1-4.*
DuPont(TM) ISECON(TM) MO99(TM), Dupont, 2009, pp. 1 and 2.*
1990 ASHRAE Handbook, Refrigeration Systems and Applications, chapter 8, titled "Lubricants in Refrigeration Systems", pp. 8.1 through 8.21.
Synthetic Lubricants and High-Performance Fluids, R. L. Shubkin, editor, Marcel Dekker, 1993, chapters 2 and 4.
IsceonMO59 Product Bulletin-k10932, 2005.
IsceonMO79 Retrofit Guidelines-k10921, 2005.

* cited by examiner

Primary Examiner — Douglas McGinty

(57) ABSTRACT

A composition comprising a refrigerant and a lubricant is disclosed, wherein the refrigerant comprises (i) a fluorocarbon selected from the group consisting of R125, R134a, R32, R152a, R143a, R218 and mixtures thereof, and (ii) a hydrocarbon selected from the group consisting of propane, n-butane, isobutane, n-pentane, isopentane, dimethyl ether, and mixtures thereof; the lubricant comprises (iii) a hydrocarbon-based lubricant component; and (iv) a synthetic lubricant component; and the synthetic lubricant component is less than 30% by weight of the total lubricant. Also disclosed are methods of replacing refrigerants in refrigeration or air conditioning systems containing a refrigerant comprising a CFC or HCFC and a lubricant. The methods involve adding to the system (a) a replacement refrigerant comprising (i) a fluorocarbon selected from the group consisting of R125, R134a, R152a, R32, R143a, R218 and mixtures thereof, and (ii) a hydrocarbon selected from the group consisting of propane, n-butane, isobutane, n-pentane, isopentane, dimethyl ether, and mixtures thereof; and (b) a synthetic lubricant component; wherein after refrigerant replacement the synthetic lubricant component is less than 30% by weight of the total amount of lubricant in the system.

11 Claims, 2 Drawing Sheets

COMPOSITIONS COMPRISING REFRIGERANT AND LUBRICANT AND METHODS FOR REPLACING CFC AND HCFC REFRIGERANTS WITHOUT FLUSHING

This application represents a national filing under 35 U.S.C. 371 of International Application No. PCT/US2010/047762, filed Sep. 23, 2010, and claims priority of U.S. Provisional Application No. 61/239,870, filed Sep. 4, 2009.

FIELD OF THE INVENTION

The present invention relates to methods for replacing chlorofluorocarbon and hydrochlorofluorocarbon refrigerants in refrigeration or air conditioning systems with a refrigerant composition comprising a fluorocarbon and a hydrocarbon without flushing to remove residual lubricant by introducing a synthetic lubricant to such systems, wherein the resultant lubricant composition has relatively low solvency power. Also, the present invention relates to a lubricant which is used with said refrigerant compositions comprising a fluorocarbon and a hydrocarbon, wherein said lubricant composition has a relatively low solvency power.

BACKGROUND OF THE INVENTION

The refrigeration industry has been working for the past few decades to find replacement refrigerants for the ozone depleting chlorofluorocarbons (CFCs) and hydrochlorofluorocarbons (HCFCs) being phased out as a result of the Montreal Protocol. The solution for most refrigerant producers has been the commercialization of hydrofluorocarbon (HFC) refrigerants.

Hydrofluorocarbon refrigerants are generally used with synthetic lubricants, such as polyol esters (POE's), polyalkylene glycols (PAG's) and polyoxypropylene glycols due to poor miscibility with hydrocarbon-based lubricants, such as mineral oil (MO). Sometimes a mixture of synthetic lubricants and hydrocarbon lubricants may be used.

Historically, retrofits of systems using hydrofluorocarbon refrigerants and a mixture of POE and mineral oil required multiple oil flushes with POE to remove residual mineral oil. This procedure had the benefit of cleaning the system because dissolved contaminants were removed with POE during flushing. Partial POE retrofit procedures entail removing a significant portion of the mineral oil and replacing it with POE without performing any flushes. This partial POE retrofit procedure introduces significant amounts of POE into the system (30%-90%) without any flushing or POE removal. Contaminants dissolved by the solvency power of oil mixtures with high levels of POE can redeposit and cause system pluggage and other detrimental effects.

Therefore, there exists a need to reduce the amount of POE used to lubricate hydrofluorocarbon refrigerant compositions.

SUMMARY OF THE INVENTION

Certain hydrofluorocarbon refrigerants, such as those sold under the trademark ISCEON® by E.I. du Pont de Nemours and Company, require no addition of POE in most cases. This is because ISCEON® refrigerants contain a small amount of hydrocarbon refrigerant which improves solubility with mineral oil. For some difficult oil return systems where mineral oil solubility is not sufficient to provide adequate oil return a small amount of POE is recommended (5-20%). And it has been unexpectedly learned that this does not significantly impact the solvency power of the mineral oil/POE mixture.

Therefore, in accordance with the present invention, there is provided a refrigerant composition with little POE used as lubricant in a lubricant mixture of mineral oil and POE. Specifically, there is provided a composition comprising: (a) a refrigerant comprising: (i) a fluorocarbon selected from the group consisting of R125, R134a, R32, R152a, R143a, R218 and mixtures thereof, and (ii) a hydrocarbon selected from the group consisting of propane, n-butane, isobutane, n-pentane, isopentane, dimethyl ether, and mixtures thereof; and (b) a lubricant comprising a hydrocarbon-based lubricant component and a synthetic lubricant component, wherein the synthetic lubricant component is less than 30% by weight of the lubricant.

In addition, in accordance with the present invention, there is provided a method of replacing a refrigerant comprising an HCFC or CFC-refrigerant and a hydrocarbon-based lubricant in a refrigeration or air conditioning system, comprising the steps of: (1) removing the HCFC or CFC refrigerant from the refrigeration system while leaving a substantial portion of the hydrocarbon-based lubricant in the system, and (2) adding to the system (a) a replacement refrigerant comprising (i) a fluorocarbon selected from the group consisting of R125, R134a, R152a, R32, R143a, R218 and mixtures thereof, and (ii) a hydrocarbon selected from the group consisting of propane, n-butane, isobutane, n-pentane, isopentane, dimethyl ether, and mixtures thereof; and (b) a synthetic lubricant component, wherein after refrigerant replacement the synthetic lubricant component is less than 30% by weight of the total amount of lubricant in the system.

DESCRIPTION OF THE PREFERRED EMBODIMENTS

Figure 1:
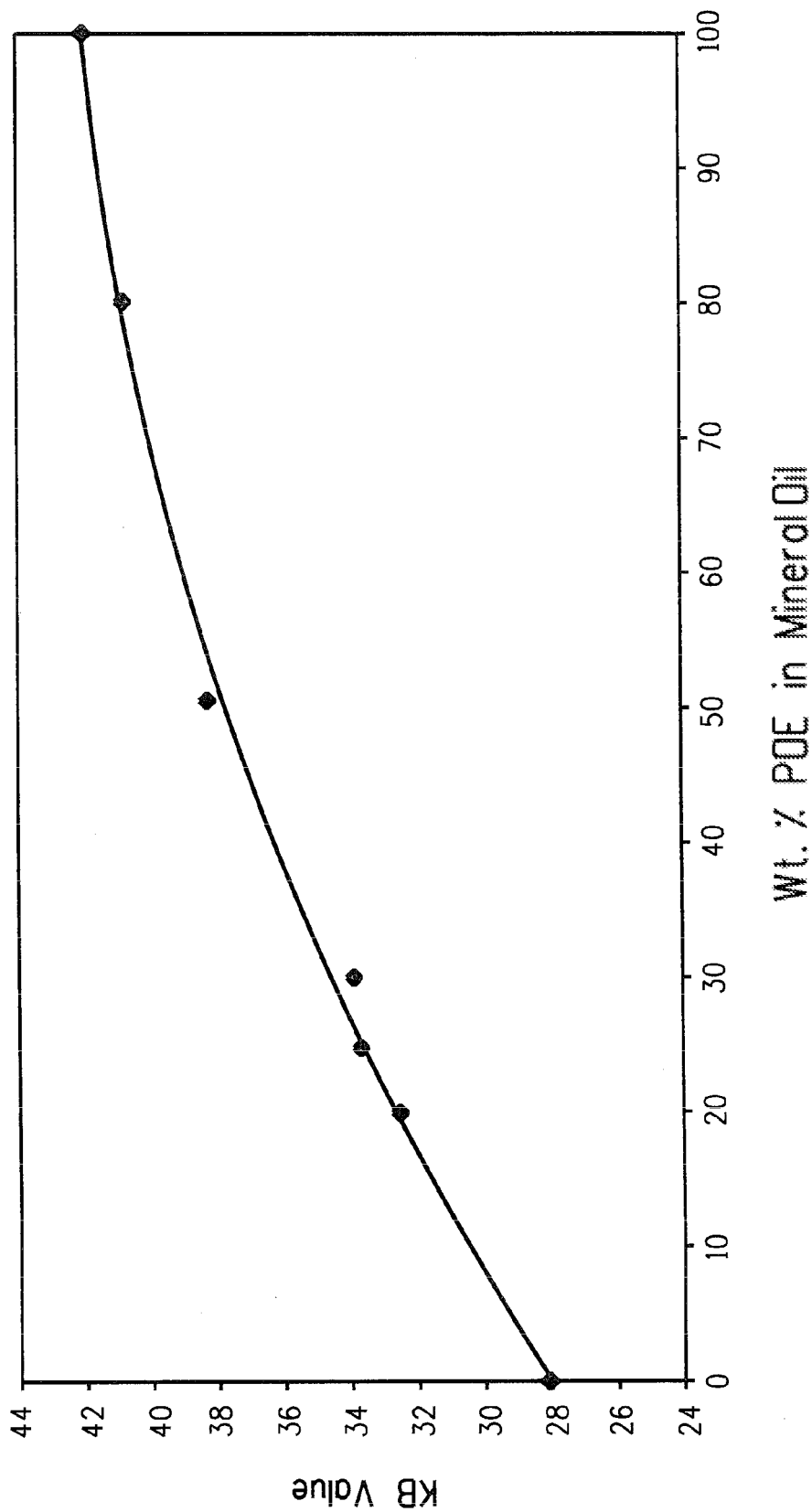
FIG. 1 is a graph showing the Kauri butanol values for lubricant compositions comprising a hydrocarbon-based lubricant and a synthetic lubricant as determined in Example 2.

In accordance with the present invention, there is provided a composition comprising a refrigerant and a lubricant. The refrigerant compositions comprise a fluorocarbon component and a hydrocarbon component. The fluorocarbons which are used with the present invention are shown in Table 1. Single fluorocarbons as shown in Table 1 or mixtures of these fluorocarbons may be used with the present invention.

TABLE 1

| Code | Structure | Name | Other designation |
|---|---|---|---|
| HFC-32 | $CH_2F_2$ | Difluoromethane | R32 |
| HFC-125 | $CF_3CHF_2$ | Pentafluoroethane | R125 |
| HFC-134a | $CF_3CH_2F$ | 1,1,1,2-tetrafluoroethane | R134a |
| HFC-152a | $CHF_2CH_3$ | 1,1-difluoroethane | R152a |
| HFC-143a | $CF_3CH_3$ | 1,1,1-trifluoroethane | R143a |
| FC-218 | $CF_3CF_2CF_3$ | octafluoropropane | R218 |

The hydrocarbons which are used with the present invention are shown in Table 2. Single hydrocarbons as shown in Table 2 or mixtures of these hydrocarbons may be used with the present invention.

TABLE 2

| Code | Structure | Name |
|---|---|---|
| R290 | $CH_3CH_2CH_3$ | Propane |
| R600 | $CH_3CH_2CH_2CH_3$ | n-butane |
| R600a | $(CH_3)_2CHCH_3$ | Isobutane |
| R601 | $CH_3CH_2CH_2CH_2CH_3$ | n-pentane |
| R601a | $(CH_3)_2CHCH_2CH_3$ | Isopentane |
| DME | $CH_3OCH_3$ | Dimethyl ether |

The fluorocarbons of Table 1 and the hydrocarbons of Table 2 may be prepared by methods known in the art or are commercially available.

In general, fluorocarbons are compounds containing carbon, fluorine and optionally hydrogen. Fluorocarbons may be saturated, unsaturated, branched, straight-chained or cyclic. Of particular utility in the present invention are those fluorocarbons listed in Table 1. In general, hydrocarbons are compounds containing carbon and hydrogen and optionally oxygen. Hydrocarbons may be saturated, unsaturated, branched, straight-chained or cyclic. Of particular utility in the present invention are those hydrocarbons listed in Table 2.

The compositions of the present invention are refrigerant compositions comprising mixtures of fluorocarbons and hydrocarbons. Representative refrigerant mixtures include, but are not limited to: R413A (ASHRAE designation for a blend containing R218, R134a, and isobutane); R417A (ASHRAE designation for a blend containing R125. R134a, and n-butane); R419A (ASHRAE designation for a blend containing R125, R134a and DME); R422, including R422A, B, C and D (ASHRAE designation for blends containing R125. R134a and isobutane); R424A (ASHRAE designation for a blend containing R125, R134a, isobutane, n-butane, and isopentane); R426A (ASHRAE designation for a blend containing R125. R134a, n-butane, and isopentane); R428A (ASHRAE designation for a blend containing R125. R143a, propane and isobutane); R430A (ASHRAE designation for a blend containing R152a and isobutane); R434A (ASHRAE designation for a blend containing R125, R134a, R143a, and isobutane); R437A (ASHRAE designation for a blend containing R125. R134a, n-butane, and n-pentane); R438A (ASHRAE designation for a blend containing R32, R125, R134a, n-butane, and isopentane); and other mixtures containing any of the components of Table 1 and Table 2.

The compositions of the present invention further include a lubricant composition comprising a hydrocarbon-based lubricant and a synthetic lubricant. Among these hydrocarbon-based lubricants are those conventionally used in vapor compression refrigeration and air-conditioning apparatus utilizing chlorofluorocarbon or hydrochlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds), such as alkylbenzenes. Lubricants of the present invention further comprise those commonly known as alkylaryls (i.e. linear and branched alkyl alkylbenzenes), paraffins and naphthenes, and poly(alphaolefins). Representative hydrocarbon-based lubricants of the present invention are lubricants such as. BVM 100 N (paraffinic mineral oil sold by BVA Oils), lubricants sold under the trademark Suniso® 3GS, Suniso® 4GS and Suniso® 5GS (naphthenic mineral oil sold by Crompton Co.), lubricants sold under the trademark Sontex® 372LT (naphthenic mineral oil sold by Pennzoil), lubricants sold under the trademark Calumet® RO-30 (naphthenic mineral oil sold by Calumet Lubricants), lubricants sold under the trademarks Zerol® 75, Zerol® 150, Zerol® 200 and Zerol® 500 (linear alkylbenzenes sold by Shrieve Chemicals) and HAB 22 (branched alkylbenzene sold by Nippon Oil). The hydrocarbon-based lubricant is preferably mineral oil.

As used herein, "synthetic lubricant" means a lubricant as recommended for use with hydrofluorocarbon refrigerants and lubricants that are miscible with the hydrofluorocarbon refrigerants of the present invention under compression refrigeration and air-conditioning apparatus' operating conditions. Some such lubricants and their properties are discussed in "Synthetic Lubricants and High-Performance Fluids", R. L. Shubkin, editor, Marcel Dekker, 1993, chapters 2 and 4. Such lubricants include, but are not limited to, polyol esters (POEs) such as the POE sold under the trademark Castor® 100 by Castrol (United Kingdom), under the trademark Ultra 22CC° by Copeland Corporation, or under the trademark Emkarate® by Uniqema, polyalkylene glycols (PAGs) such as RL-488A from Dow Chemical (Midland, Mich.), polyvinyl ethers (PVEs), and polycarbonates (PCs) such as MA2320F from Mitsui & Co., Ltd. (Tokyo, Japan). The synthetic lubricant is preferably a polyol ester.

In accordance with one embodiment of the present invention, the lubricant comprises less than 30% by weight of the synthetic lubricant component. In another embodiment, the lubricant may comprise less than 25% by weight of the synthetic lubricant component. In another embodiment, the lubricant may comprise less than 20% by weight of the synthetic lubricant component. And in another embodiment, the lubricant may comprise from greater than zero to less than 30% by weight of the synthetic lubricant component (e.g., from 1 to less than 30%). The lubricant may also comprise greater than zero to less than 25% by weight or less of the synthetic lubricant component (e.g., from 1 to 25% by weight synthetic lubricant), or from greater than zero to 20% by weight or less synthetic lubricant (e.g., from 1 to 20% by weight synthetic lubricant).

In other embodiments, the lubricant may comprise from 5 to less than 30% by weight of the synthetic lubricant component. Additionally, the lubricant may comprise from 5 to 25% by weight of the synthetic lubricant component. And also, the lubricant may comprise from 5 to 20% by weight of the synthetic lubricant component.

In accordance with the present invention, the lubricant composition may have a Kauri-butanol value of less than 35. Additionally, the Kauri-butanol value may be less than 34 and also, the Kauri-butanol value may be less than 33.

The Kauri-butanol value ("Kb value") is an international, standardized measure of solvency power for a solvent, and is governed by an ASTM (American Society for Testing and Materials) standardized test, ASTM D1133. The result of this test is a scaleless index, usually referred to as the "Kb value". A higher Kb value means the solvent is more aggressive or active in the ability to dissolve certain materials. Mild solvents have low scores in the tens and twenties, while the most powerful solvents, such as chlorinated solvents and naphthenic aromatic solvents, have ratings as high as the low hundreds.

In accordance with another embodiment of the present invention, the lubricant may have an aniline point temperature of at least 60° C. In another embodiment, the lubricant may have an aniline point temperature of at least 62° C. Additionally, the lubricant may have an aniline point temperature of at least 65° C. The aniline point is defined as the minimum temperature for complete miscibility of equal volumes of aniline and the sample under test ASTM Method D611. Aniline point is often specified for spray oils, cleaning solvents, and thinners, where solvency power is desired. A lower aniline point temperature is indicative of stronger solvency power.

The compositions of the present invention may further comprise certain refrigeration or air-conditioning system additives, as desired, in order to enhance performance and system stability. These additives are known in the field of refrigeration and air-conditioning, and include, but are not limited to, anti wear agents, extreme pressure lubricants, corrosion and oxidation inhibitors, metal surface deactivators, free radical scavengers, and foam control agents. In general, these additives may be present in the inventive compositions in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-0-Ad 8478 from Akzo Chemicals, tricresyl phosphates and related compounds. Additionally, the metal dialkyl dithiophosphates (e.g., zinc dialkyl dithiophosphate (or ZDDP), Lubrizol 1375 and other members of this family of chemicals may be used in compositions of the present invention. Other antiwear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodeceyl succinic acid (DDSA), amine phosphate (AP), oleoyl sarcosine, imidazone derivatives and substituted sulfphonates. Metal surface deactivators include areoxalyl bis(benzylidene)hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

In other embodiments, the compositions disclosed herein may further include a perfluoropolyether. A common characteristic of perfluoropolyethers is the presence of perfluoroalkyl ether moieties. Perfluoropolyether is synonymous to perfluoropolyalkylether. Other synonymous terms frequently used include "PFPE", "PFAE", "PFPE oil", "PFPE fluid", and "PFAE". In some embodiments, the perfluoropolyether has the formula of $CF_3$—$(CF_2)_2$—O—[$CF(CF_3)$—$CF_2$—O] j'-R'f, and is commercially available from DuPont under the trademark Krytox®. In the immediately preceding formula, j' is 2-100, inclusive and R'f is $CF_2CF_3$, a C3 to C6 perfluoroalkyl group, or combinations thereof.

Other PFPEs, commercially available from Ausimont of Milan, Italy, and Montedison S.p.A., of Milan, Italy, under the trademarks Fomblin® and Galden®, respectively, and produced by perfluoroolefin photooxidation, can also be used. PFPE commercially available under the trademark Fomblin®-Y can have the formula of $CF_3O(CF_2CF(CF_3)$—O—$)_{m'}(CF_2$—O—$)_{n'}$—$R_{1f}$. Also suitable is $CF_3O[CF_2CF(CF_3)O]_{m'}(CF_2CF_2O)_{o'}(CF_2O)_{n'}$—$R_{1f}$. In the formulae $R_{1f}$ is $CF_3$, $C_2F_5$, $C_3F_7$, or combinations of two or more thereof; (m'+n') is 8-45, inclusive; and m/n is 20-1000, inclusive; o' is 1; (m'+n'+o') is 8-45, inclusive; m'/n' is 20-1000, inclusive.

PFPE commercially available under the trademark Fomblin®-Z can have the formula of $CF_3O(CF_2CF_2$—O—$)_{p'}$ $(CF_2$—O$)_{q'}CF_3$ where (p'+q') is 40-180 and p'/q' is 0.5-2, inclusive.

Another family of PFPE, commercially available under the trademark Demnum™ from Daikin Industries, Japan, can also be used. It can be produced by sequential oligomerization and fluorination of 2,2,3,3-tetrafluorooxetane, yielding the formula of F—[$(CF_2)_3$—O$]_{t'}$—$R_{2f}$ where $R_{2f}$ is $CF_3$, $C_2F_5$, or combinations thereof and t' is 2-200, inclusive.

In some embodiments, the PFPE is unfunctionalized. In an unfunctionalized perfluoropolyether, the end group can be branched or straight chain perfluoroalkyl radical end groups. Examples of such perfluoropolyethers can have the formula of $C_{r'}F_{(2r'+1)}$-A-$C_{r'}F_{(2r'+1)}$ in which each r' is independently 3 to 6; A can be O—$(CF(CF_3)CF_2$—O$)_{w'}$, O—$(CF_2$—O$)_{x'}$, $(CF_2CF_2$—O$)_{y'}$, O—$(C_2F_4$—O$)_{w'}$, O—$(C_2F_4$—O$)_{x'}(C_3F_6$—O$)_{y'}$, O—$(CF(CF_3)CF_2$—O$)_{x'}(CF_2$—O$)_{y'}$, O—$(CF_2CF_2CF_2$—O$)_{w'}$, O—$(CF(CF_3)CF_2$—O$)_{x'}$ $(CF_2CF_2$—O$)_{y'}$—$(CF_2$—O$)_{z'}$, or combinations of two or more thereof; In some embodiments. A is O—$(CF(CF_3)$ $CF_2$—O$)_{w'}$, O—$(C_2F_4$—O$)_{w'}$, O—$(C_2F_4$—O$)_{x'}(C_3F_6$—O$)_{y'}$, O—$(CF_2CF_2CF_2$—O$)_{w'}$, or combinations of two or more thereof; w' is 4 to 100; x' and y' are each independently 1 to 100. Specific examples include, but are not limited to, F(CF(CF_3)—CF_2—O)_9—CF_2CF_3, F(CF(CF_3)—CF_2—O)_9—CF(CF_3)_2, and combinations thereof. In such PFPEs, up to 30% of the halogen atoms can be halogens other than fluorine, such as, for example, chlorine atoms.

A functionalized PFPE is a PFPE wherein at least one of the two end groups of the perfluoropolyether has at least one of its halogen atoms substituted by a group selected from esters, hydroxyls, amines, amides, cyanos, carboxylic acids, sulfonic acids or combinations thereof. In other embodiments, the two end groups of the perfluoropolyether, independently, are functionalized by the same or different groups.

In some embodiments, representative ester end groups include —$COOCH_3$, —$COOCH_2CH_3$, —$CF_2COOCH_3$, —$CF_2COOCH_2CH_3$, —$CF_2CF_2COOCH_3$, —$CF_2CF_2COOCH_2CH_3$, —$CF_2CH_2COOCH_3$, —$CF_2CF_2CH_2COOCH_3$, —$CF_2CH_2CH_2COOCH_3$, —$CF_2CF_2CH_2CH_2COOCH_3$.

In some embodiments, representative hydroxyl end groups include —$CF_2OH$, —$CF_2CF_2OH$, —$CF_2CH_2OH$, —$CF_2CF_2CH_2OH$, —$CF_2CH_2CH_2OH$, —$CF_2CF_2CH_2CH_2OH$.

In some embodiments, representative amine end groups include —$CF_2NR^1R^2$, —$CF_2CF_2NR^1R^2$, —$CF_2CH_2NR^1R^2$, —$CF_2CF_2CH_2NR^1R^2$, —$CF_2CH_2CH_2NR^1R^2$, —$CF_2CF_2CH_2CH_2NR^1R^2$, wherein $R^1$ and $R^2$ are independently H, $CH_3$, or $CH_2CH_3$.

In some embodiments, representative amide end groups include —$CF_2C(O)NR^1R^2$, —$CF_2CF_2C(O)NR^1R^2$, —$CF_2CH_2C(O)NR^1R^2$, —$CF_2CF_2CH_2C(O)NR^1R^2$, —CF$_2$CH$_2$CH$_2$C(O)NR$^1$R$^2$, —CF$_2$CF$_2$CH$_2$CH$_2$C(O)NR$^1$R$^2$, wherein R$^1$ and R$^2$ are independently H, CH$_3$, or CH$_2$CH$_3$.

In some embodiments, representative cyano end groups include —CF$_2$CN, —CF$_2$CF$_2$CN, —CF$_2$CH$_2$CN, —CF$_2$CF$_2$CH$_2$CN, —CF$_2$CH$_2$CH$_2$CN, —CF$_2$CF$_2$CH$_2$CH$_2$CN.

In some embodiments, representative carboxylic acid end groups include —CF$_2$COOH, —CF$_2$CF$_2$COOH, —CF$_2$CH$_2$COOH, —CF$_2$CF$_2$CH$_2$COOH, —CF$_2$CH$_2$CH$_2$COOH, —CF$_2$CF$_2$CH$_2$CH$_2$COOH.

In some embodiments, the sulfonic acid end groups are selected from the group consisting of —S(O)(O)OR$^3$, —S(O)(O)R$^4$, —CF$_2$OS(O)(O)OR$^3$, —CF$_2$CF$_2$OS(O)(O)OR$^3$, —CF$_2$CH$_2$OS(O)(O)OR$^3$, —CF$_2$CF$_2$CH$_2$OS(O)(O)OR$^3$, —CF$_2$CH$_2$CH$_2$OS(O)(O)OR$^3$, —CF$_2$CF$_2$CH$_2$CH$_2$O S(O)(O)OR$^3$, —CF$_2$S(O)(O)OR$^3$, —CF$_2$CF$_2$ S(O)(O)OR$^3$, —CF$_2$CH$_2$S(O)(O)OR$^3$, —CF$_2$CF$_2$CH$_2$S(O)(O)OR$^3$, —CF$_2$CH$_2$CH$_2$S(O)(O)OR$^3$, —CF$_2$CF$_2$CH$_2$CH$_2$S(O)(O)OR$^3$, —CF$_2$OS(O)(O)R$^4$, —CF$_2$CF$_2$OS(O)(O)R$^4$, —CF$_2$CH$_2$OS(O)(O)R$^4$, —CF$_2$CF$_2$CH$_2$O S(O)(O)R$^4$, —CF$_2$CH$_2$CH$_2$OS(O)(O)R$^4$, —CF$_2$CF$_2$CH$_2$CH$_2$OS(O)(O)R$^4$, wherein R$^3$ is H, CH$_3$, CH$_2$CH$_3$, CH$_2$CF$_3$, CF$_3$, or CF$_2$CF$_3$, R$^4$ is CH$_3$, CH$_2$CH$_3$, CH$_2$CF$_3$, CF$_3$, or CF$_2$CF$_3$.

Further in accordance with the present invention, there is provided a method of replacing a refrigerant in a refrigeration or air conditioning system containing a refrigerant comprising an HCFC or CFC refrigerant and a hydrocarbon-based lubricant, said method comprising the steps of (1) removing the CFC or HCFC refrigerant from the refrigeration system while leaving a substantial portion of the hydrocarbon-based lubricant in the system, and (2) adding to the system (a) a replacement refrigerant comprising (i) a fluorocarbon selected from the group consisting of R125, R134a, R152a, R32, R143a, R218 and mixtures thereof, and (ii) a hydrocarbon selected from the group consisting of propane, n-butane, isobutane, n-pentane, isopentane, dimethyl ether, and mixtures thereof; and (b) a synthetic lubricant component; wherein after refrigerant replacement the synthetic lubricant component is less than 30% by weight of the total amount of lubricant in the system.

The CFC or HCFC component of the refrigerant which is replaced may be dichlorodifluoromethane (CFC-12, or R12), chlorodifluoromethane (HCFC-22, or R22), or a mixture of refrigerants that contains at least one CFC or HCFC compound. Representative mixtures containing CFCs and/or HCFCs include R401A, R401B, or R401C (ASHRAE designations for blends containing R22, R152a, and 2-chloro-1,1,1,2-tetrafluoroethane (HFC-124 or R124)); R409A or R409B (ASHRAE designations for blends containing R22, R124, and 1-chloro-1,1-difluoroethane (HCFC-142b or R142b); R414A or R414B (ASHRAE designations for blends containing R22, R124, R142b, and isobutane); R402A or R402B (ASHRAE designations for blends containing R125. R22 and propane), and R408A (ASHRAE designation for a blend containing R125, R143a and R22).

The step of replacing the HCFC or CFC refrigerant from a refrigeration system includes the step of removing the HCFC or CFC refrigerant from the refrigeration system. As used herein the term "refrigeration system" refers generally to any system or apparatus, or any part or portion of such a system or apparatus, which employs a refrigerant to provide cooling and/or heating. Such refrigeration systems include, for example, air conditioners, refrigerators, chillers, heat pumps, transport refrigeration systems, commercial refrigeration systems such as supermarket racks or single condensing units and the like. The chillers may be centrifugal chillers or screw chillers, meaning that the compressor in the chiller is either a centrifugal compressor or a screw compressor. Additionally, the chiller may be a direct expansion chiller or a flooded evaporator chiller.

According to the present invention, when the HCFC or CFC refrigerant is removed from the refrigeration system, a substantial portion of the hydrocarbon-based lubricant is left in the system. In one embodiment, this hydrocarbon-based lubricant is 100% mineral oil.

The HCFC or CFC refrigerant is replaced by adding to the system (a) a replacement refrigerant comprising (i) a fluorocarbon selected from the group consisting of R125, R134a, R152a, R32, R143a, R218 and mixtures of any of these, in combination with (ii) a hydrocarbon selected from the group consisting of propane, n-butane, isobutane, n-pentane, isopentane, DME and mixtures thereof as described above. Representative mixtures of fluorocarbon refrigerants include, but are not limited to: R413A (ASHRAE designation for a blend containing R218. R134a, and isobutane); R417A (ASHRAE designation for a blend containing R125. R134a, and n-butane); R419A (ASHRAE designation for a blend containing R125, R134a and DME); R422, including R422A, B, C and D (ASHRAE designation for blends containing R125, R134a and isobutane); R424A (ASHRAE designation for a blend containing R125. R134a, isobutane, n-butane, and isopentane); R426A (ASHRAE designation for a blend containing R125, R134a, n-butane, and isopentane); R428A (ASHRAE designation for a blend containing R125. R143a, propane and isobutane); R430A (ASHRAE designation for a blend containing R152a and isobutane); R434A (ASHRAE designation for a blend containing R125, R134a, R143a, and isobutane); R437A (ASHRAE designation for a blend containing R125, R134a, n-butane, and n-pentane); R438A (ASHRAE designation for a blend containing R32, R125, R134a, n-butane, and isopentane); and other mixtures containing any of the components of Table 1 and Table 2.

A synthetic lubricant is introduced to the hydrocarbon-based lubricant left in the system. After refrigerant replacement the synthetic lubricant component left in the system is less than 30% by weight of the total amount of lubricant in the system. The synthetic lubricant component may be less than 25% by weight of the total amount of lubricant in the system. Additionally, the synthetic lubricant component may be less than 20% by weight of the total amount of lubricant in the system.

In accordance with another embodiment of the present invention, the synthetic lubricant component is greater than zero and less than 30% (e.g., from 1 to less than 30%) by weight of the total amount of lubricant in the system. In another embodiment, the synthetic lubricant component may be greater than zero and less than 25% (e.g., from 1 to less than 25%) by weight of the total amount of lubricant in the system. In another embodiment, the synthetic lubricant component may be greater than zero and less than 20% (e.g., from 1 to less than 20%) by weight of the total amount of lubricant in the system.

In other embodiments, the synthetic lubricant may be from 5 to less than 30% by weight of the total amount of lubricant in the system. Additionally, the synthetic lubricant may be from 5 to less than 25% by weight of the total amount of lubricant in the system. And also, the synthetic lubricant may be from 5 to less than 20% by weight of the total amount of lubricant in the system.

In one embodiment, the combination of hydrocarbon-based lubricant and synthetic lubricant resulting after refrigerant replacement has a Kauri-butanol value of less than 35. In another embodiment, the combination of hydrocarbon-based lubricant and synthetic lubricant resulting after refrigerant replacement has a Kauri-butanol value less than 34. And in another embodiment, the combination of hydrocarbon-based lubricant and synthetic lubricant resulting after refrigerant replacement has a Kauri-butanol value of less than 33.

Further, in one embodiment, the combination of hydrocarbon-based lubricant and synthetic lubricant resulting after refrigerant replacement has an aniline point temperature of at least 60° C. In another embodiment, the combination of hydrocarbon-based lubricant and synthetic lubricant resulting after refrigerant replacement has an aniline point temperature of at least 62° C. And in another embodiment, the combination of hydrocarbon-based lubricant and synthetic lubricant resulting after refrigerant replacement has an aniline point temperature of at least 65° C.

Further, in accordance with the present invention is provided a method of replacing a refrigerant in a refrigeration or air conditioning system containing a first refrigerant comprising a CFC or HCFC and a first lubricant, comprising the steps of (1) removing the first refrigerant from the refrigeration system while leaving a substantial portion of the first lubricant in the system; and (2) adding (a) a second refrigerant wherein the second refrigerant is different from the first refrigerant and comprises (i) a fluorocarbon selected from the group consisting of R125, R134a, R152a, R32, R143a, R218 and mixtures thereof; and (ii) a hydrocarbon selected from the group consisting of propane, n-butane, isobutane, n-pentane, isopentane, dimethyl ether, and mixtures thereof; and (b) a synthetic lubricant component; wherein after refrigerant replacement the synthetic lubricant component is less than 30% by weight of the total amount of lubricant in the system.

In one embodiment, after refrigerant replacement, the synthetic lubricant component is less than 30% by weight of the total amount of lubricant in the system. In another embodiment, after refrigerant replacement, the synthetic lubricant component may be less than 25% by weight of the total amount of lubricant in the system. Additionally, in another embodiment, after refrigerant replacement, the synthetic lubricant component may be less than 20% by weight of the total amount of lubricant in the system.

In one embodiment, the combination of the hydrocarbon-based lubricant and synthetic lubricant resulting in the system after refrigerant replacement has a Kauri-butanol value of less than 35. In another embodiment, the combination of the hydrocarbon-based lubricant and synthetic lubricant resulting in the system after refrigerant replacement has a Kauri-butanol value of less than 34. In another embodiment, the combination of the hydrocarbon-based lubricant and synthetic lubricant resulting in the system after refrigerant replacement has a Kauri-butanol value of less than 33.

In one embodiment, the combination of the hydrocarbon-based lubricant and synthetic lubricant resulting in the system after refrigerant replacement has an aniline point temperature of at least 60° C. In another embodiment, the combination of the hydrocarbon-based lubricant and synthetic lubricant resulting in the system after refrigerant replacement has an aniline point temperature of at least 62° C. In another embodiment, the combination of the hydrocarbon-based lubricant and synthetic lubricant resulting in the system after refrigerant replacement has an aniline point temperature of at least 65° C.

EXAMPLES

Example 1

Aniline Point Measurement for Mineral Oil and Polyolester Lubricants

Figure 2:
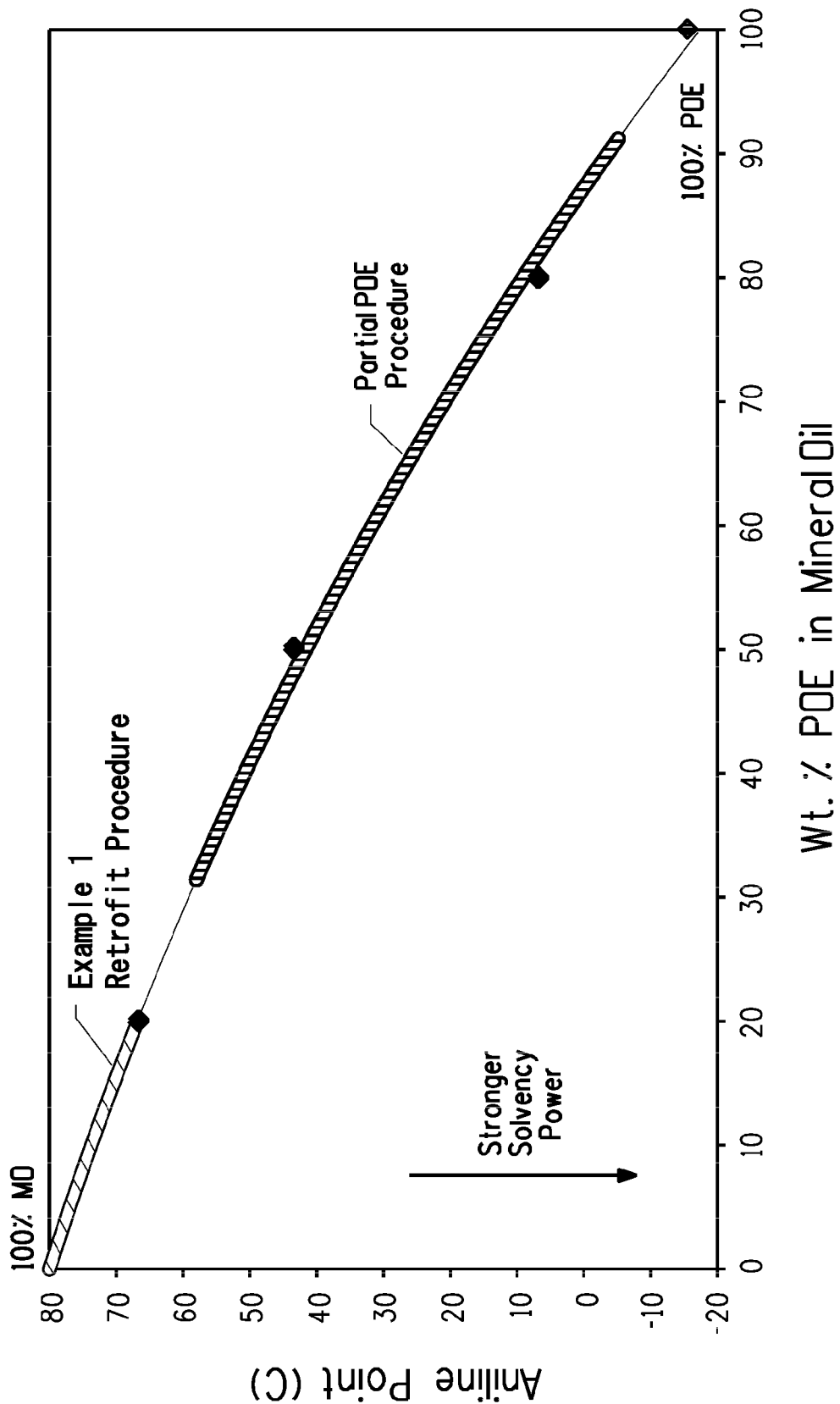
FIG. 2 is a graph showing the aniline point temperatures for lubricant compositions comprising a hydrocarbon-based lubricant and a synthetic lubricant for Example 1 versus the higher POE values of the conventional methods.

Aniline point experiments were conducted per ASTM D611-07 to determine the solvency power of mineral oil and polyol ester (POE) lubricants and their mixtures. For each test, 10 mL of aniline and 10 mL of lubricant sample were placed in a vessel and mixed at room temperature. The mixture was then heated at a controlled rate until two phases changed to one phase and became miscible. The mixture was then cooled at a controlled rate and the temperature at which the two phases separated was determined to be the aniline point. Samples tested included two different mineral oils, Suniso® 3GS and Suniso® 4GS and two different POEs, Emkarate® RL32H and Emkarate® RL32-3MAF. Also tested were mixtures of 3GS and POE RL32H. A lower aniline point is indicative of stronger solvency power. Results are shown in Table 3 below and in FIG. 2.

TABLE 3

| Lubricant | Aniline Point (C.) |
|---|---|
| 100% wt 4GS | 84 |
| 100% wt 3GS | 79 |
| 80% wt 3GS/wt 20% POE RL32H | 66 |
| 75% wt 3GS/wt 25% POE RL32H | 60 |
| 70% wt 3GS/wt 30% POE RL32H | 55 |
| 50% wt % 3GS/50% wt % POE-RL32H | 43 |
| 20 wt % 3GS/80 wt % POE | 6 |
| 100% wt % POE RL32H | <−16 |
| 100 wt % POE RL32-3MAF | <−16 |

The data in Table 3 indicate that mineral oil has significantly lower solvency power than POE ISubricant based on aniline point results. Therefore, mineral oil is significantly less likely than POE lubricant to dissolve residues and deposits during an air conditioning or refrigeration system retrofit which can then redeposit elsewhere in the system and cause pluggage and/or premature failure. Mixtures containing up to 20 or 30 wt % POE RL32H in mineral oil had only a modest decrease in aniline point temperature and thus a modest increase in solvency power. Therefore, up to 20 or 30 wt % POE may be added to a refrigeration or air conditioning system during a retrofit, if required, to improve oil return without dissolving deposits in the system, thus preventing system pluggage and/or failure.

Example 2

Kauri-Butanol Value Measurement for Mineral Oil and Polyolester Lubricants

Kauri-butanol (Kb) values were measured per ASTM D1133-09 to determine the solvency power of mineral oil and polyol ester (POE) lubricants and their mixtures. For each test, 20 g of Kauri-butanol solution (prepared from 400 g kauri resin and 2000 g n-butanol) was placed in an Erlenmeyer flask. Lubricant was slowly added to the flask until a defined degree of turbidity was reached and the lubricant volume titrated was recorded. This result was compared to two standards, toluene and 25 vol % toluene/75 vol % heptane. The Kauri-butanol value was calculated as follows:

$$Kb = [65(C-B)/(A-B)] + 40$$

Where A=toluene required to titrate 20 g of Kb solution, mL
B=toluene-heptane blend required to titrate 20 g of Kb solution, mL
C=test lubricant required to titrate 20 g of Kb solution, mL A higher Kb value is indicative of stronger solvency power. Samples tested included two different lubricants, Suniso® 3GS and POE Emkarate® RL32H and mixtures thereof.

Results are shown in Table 4 below and in FIG. 1, which shows weight percent Emkarate® RL32H in Suniso 3GS mineral oil.

TABLE 4

| Lubricant | Kb Value |
| --- | --- |
| 100% wt 3GS | 28.0 |
| 80% wt 3GS/wt 20% POE RL32H | 32.6 |
| 75% wt 3GS/wt 25% POE RL32H | 33.7 |
| 70% wt 3GS/wt 30% POE RL32H | 33.9 |
| 50% wt % 3GS/50% wt % POE RL32H | 38.4 |
| 20 wt % 3GS/80 wt % POE | 41.0 |
| 100% wt % POE RL32H | 42.0 |

The data in Table 4 indicate that mineral oil has significantly lower solvency power than POE lubricant based on Kb values. Therefore, mineral oil is significantly less likely than POE lubricant to dissolve residues and deposits during an air conditioning or refrigeration system retrofit which can then redeposit elsewhere in the system and cause pluggage or premature failure. Mixtures containing up to 20 or 30 wt % POE RL32H in mineral oil had only a modest increase in Kb value or solvency power. Therefore, up to 20 or 30 wt % POE may be added to a refrigeration or air conditioning system during a retrofit, if required, to improve oil return without dissolving deposits in the system, thus preventing system pluggage and/or failure.

Example 3

Kauri-Butanol Value Measurement for Mixtures of Refrigerant, Mineral Oil, and Polyolester Lubricants The method for measuring a KB value for refrigerant/lubricant mixtures was adapted from ASTM D1133-09 for use on mixtures of gases and liquids. 20 grams of Kauri-butanol solution was added to a sealed aerosol bottle. The mineral oil-POE mixture was added to a second sealed aerosol bottle. The refrigerant was then added to the second aerosol bottle under pressure until layer separation of the materials occurred. This second bottle containing the mineral oil-POE-refrigerant mixture was inverted so that the oil mixture saturated with the refrigerant was at the bottom with a small dip tube and the remaining immiscible refrigerant (both liquid and vapor) were on the top.

The oil layer under pressure was then slowly added to the 20 gram Kb solution aerosol bottle via a transfer tube between the bottles. The Kb solution bottle was swirled as the oil mixture saturated with refrigerant was added and addition continued until a defined degree of turbidity was reached. The weight of oil mixture transferred was recorded and Kb value calculated per standard calculation as described in the ASTM method.

The data in Table 5, shows the results for refrigerants R407C (a mixture of 23 wt % HFC-32, 25 wt % HFC-125, and 52 wt % HFC-134a) and R438A (a mixture of 8.5 wt % HFC-32, 45 wt % HFC-125, 44.2 wt % HFC-134a, 1.7 wt % n-butane, and 0.6 wt % isopentane).

TABLE 5

| Mixture components | | | | |
| --- | --- | --- | --- | --- |
| R407C (wt, grams) | R438A (wt, grams) | 3GS MO (wt, grams) | POE RL 32H (wt, grams) | KB Value |
| 100 | | | | 11.2 |
| 50 | | 50 | | 27.8 |

TABLE 5-continued

| Mixture components | | | | |
| --- | --- | --- | --- | --- |
| R407C (wt, grams) | R438A (wt, grams) | 3GS MO (wt, grams) | POE RL 32H (wt, grams) | KB Value |
| 50 | | 37.5 | 12.5 | 34.3 |
| 50 | | 25 | 25 | 40.9 |
| | 100 | | | 12.2 |
| | 50 | 50 | | 28.0 |
| | 50 | 37.5 | 12.5 | 35.3 |
| | 50 | 25 | 25 | 38.8 |

The results show that even in the presence of refrigerant with the lubricant, mixtures with lower amounts of POE still have lower KB values. Adding lower amounts of POE will aid oil return, but reduce the potential to dissolve and redeposit contaminants in the system which can result in system performance issues.

What is claimed is:

1. A composition comprising:
   (a) a refrigerant comprising R125, R134a, R32, n-butane and isopentane; and
   (b) a lubricant comprising
   (iii) a hydrocarbon-based lubricant component; and
   (iv) a synthetic lubricant component; wherein the synthetic lubricant component is 20% to 30% by weight of the lubricant.

2. The composition of claim 1, wherein the hydrocarbon-based lubricant is mineral oil and the synthetic lubricant is polyol ester (POE).

3. The composition of claim 1, wherein the lubricant has a Kauri-butanol value of less than 35.

4. The composition of claim 1 wherein the lubricant composition has an aniline point temperature of at least 60° C.

5. A method of replacing a refrigerant in a refrigeration or air conditioning system containing a refrigerant comprising a CFC or HCFC and a hydrocarbon-based lubricant, said method comprising the steps of:
   (1) removing the CFC or HCFC refrigerant from the refrigeration system while leaving a substantial portion of the hydrocarbon-based lubricant in the system, and
   (2) adding to the system
   (a) a replacement refrigerant comprising R125, R134a, R32, n-butane and isopentane;
   (b) a synthetic lubricant component; wherein after refrigerant replacement the synthetic lubricant component is 20% to 30% by weight of the total amount of lubricant in the system.

6. The method of claim 5, wherein the hydrocarbon-based lubricant is mineral oil and the synthetic lubricant is polyol ester (POE).

7. The method of claim 5 wherein the combination of hydrocarbon-based lubricant and synthetic lubricant resulting after refrigerant replacement has a Kauri-butanol value of less than 35.

8. The method of claim 5 wherein the combination of hydrocarbon-based lubricant and synthetic lubricant resulting after refrigerant replacement has an aniline point temperature of at least 60° C.

9. A method of replacing a refrigerant in a refrigeration or air conditioning system containing a first refrigerant comprising a CFC or HCFC and a first lubricant, comprising the steps of:
   (1) removing the first refrigerant from the refrigeration system while leaving a substantial portion of the first lubricant in the system; and (2) adding
- (a) a second refrigerant wherein the second refrigerant is different from the first refrigerant and comprises R125, R134a, R32, n-butane and isopentane; and
- (b) a synthetic lubricant component; wherein after refrigerant replacement the synthetic lubricant component is 20% to 30% by weight of the total amount of lubricant in the system.

10. The method of claim 9, wherein the combination of hydrocarbon-based lubricant and synthetic lubricant resulting after refrigerant replacement has a Kauri-butanol value of less than 35.

11. The method of claim 9, wherein the combination of hydrocarbon-based lubricant and synthetic lubricant resulting after refrigerant replacement has an aniline point temperature of at least 60° C.

* * * * *